Feb. 20, 1968    NAOYUKI FUJITA    3,369,795
HOISTING DEVICE
Filed Jan. 13, 1967

INVENTOR
NAOYUKI FUJITA

BY
Maglew & Toren
ATTORNEYS

United States Patent Office 3,369,795
Patented Feb. 20, 1968

3,369,795
HOISTING DEVICE
Naoyuki Fujita, 22–2 3-chome, Shimo,
Kitak-ku, Tokyo, Japan
Filed Jan. 13, 1967, Ser. No. 609,173
Claims priority, application Japan, Mar. 8, 1966,
41/13,807
5 Claims. (Cl. 254—169)

ABSTRACT OF THE DISCLOSURE

A hoisting device having a drive or transmission which is automatically changed from a low speed high power transmission under load to a high speed relatively low powered transmission when unloaded.

---

In general, hoisting mechanisms which are either manually or automatically driven include transmissions or gear mechanisms which provide for a power magnification. Such transmissions include a series of gear combinations having certain reduction ratios in order that a heavy load may be lifted or lowered using a magnified power transmission. Because of the constant reduction ratios of the gears which are employed in such a transmission, the speed of operation of a lifting cable which is to be secured to the load will be the same whether or not the load is supported by the cable. Because the cable or the chain which is to be connected to the load in such devices must be moved at a relatively low speed even though it does not carry any load, there is a great amount of wasted time in positioning such chain or cable at a location at which it may be connected to the load.

In accordance with the present invention, there is provided a hoist which includes a drive which provides for a direct rotative power connection to a winding drum when a load cable or chain carried by the drum is unloaded but provides for an automatic shifting of a gear mechanism to provide for a gear drive and high power as soon as the load is applied to the lifting cable or chain. The invention may advantageously be embodied in a hoist which may be either manually operated or motor driven and which includes a drive shaft which may be mechanically directly connected to a winding pulley for a load chain or cable by means which urges a gear member into a clutch when the loading drum is unloaded. The drive mechanism is such that the shiftable clutch gear will be out of engagement for the direct drive relationship and into engagement with a series of reduction gears for high power as soon as the winding drum is loaded. In order to facilitate this action in accordance with one feature of the invention, the clutch gear is carried on a spline shaft having spiral spline grooves which are curved to urge the clutch gear out of clutch engagement when the winding drum is loaded and to permit it to move into engagement for direct drive when the winding drum is unloaded. In addition, the clutch gear meshes with a further gear of the gear chain in a manner such that it is urged to a position out of clutch engagement and in gear driving engagement during any loaded condition so that there is no likelihood that the gears would suddenly become unmeshed.

Accordingly it is an object of the invention to provide a hoisting device which includes means for operating at a high speed with little or no gear reduction when the device is unloaded but which will automatically switch to operation at relatively slow speed and high gear reduction when the device is loaded.

A further object of the invention is to provide a hoisting device which includes a drive shaft which may be connected to a hoisting drum through a clutch gear and wherein the clutch gear will be urged into clutching engagement for direct drive of the winding drum when the winding drum is unloaded but will be urged out of clutching engagement and into engagement with a transmission reduction gearing for driving the drum at high power and low speed when the drum becomes loaded.

A further object of the invention is to provide a hoisting device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
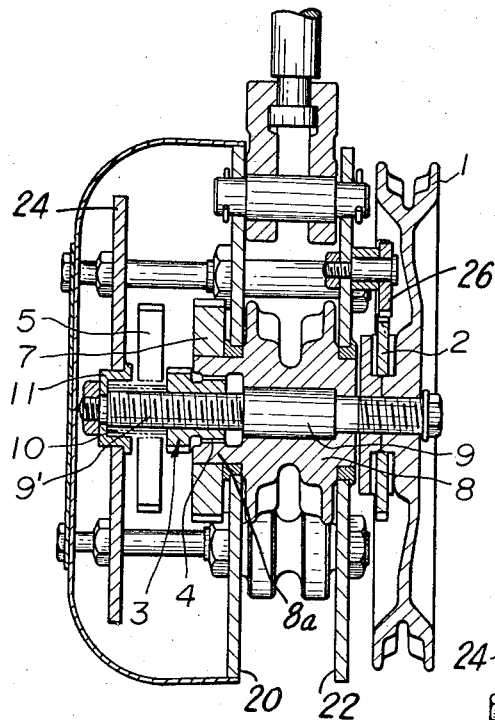
FIG. 1 is a section taken on the line 1—1 of FIG. 3 of a hoist constructed in accordance with the invention.

Referring to the drawings in particular, the invention embodied therein comprises a chain or cable hoist which may be either driven by a motor or mechanically driven and which includes a drive shaft 9 which is connected at its one end to a hand chain wheel 1 which may be rotated, for example, by engagement of a chain in a groove defined around its periphery or by a belt from a driving motor, for example. The drive shaft 9 is rotatably carried within a winding drum 8 for a cable or chain which is suitably journalled for rotation between plate members 20 and 22.

In accordance with the invention, the winding drum 8 is provided with a hub extension 8a having an internal clutch or spline formation which engages with a clutch gear generally designated 3. The clutch gear 3 is provided with internal spline threads to permit it to be engaged for rotative and axial displacement along a spline shaft 9' formed as an extension of the drive shaft 9. The spline provided on the spline shaft 9 is of a spiral type having a torsion angle which is disposed in an opposite direction to the direction of winding up revolution of the driving shaft 9. The clutch gear 3 is provided with a clutch portion 4 which engages within the clutch portion 8a of the winding drum 8 to provide for a direct drive from the drive shaft 9 to the winding drum 8 whenever the winding drum 8 is unloaded. The clutch gear 3 will be maintained by the spline formation on the spline shaft 9' in a clutch engaging position when in the unloaded state. A spring 10 is provided to insure that this engagement will be maintained or will be effected whenever the winding drum 8 is unloaded. Under normal unloading conditions, the clutch gear 3 will normally ride along the spline defined on the spline shaft 9' in a direction toward a stop 11 defined on a wall 24. In order to overcome this tendency, a compression spring 10 is disposed between the stop member 11 and the end face of the clutch gear 3 to urge the gear into clutching engagement in the unloaded condition. A brake element which includes a disk element 2 which is carried on the winding chain wheel 1 acts as a non-return brake on conjunction with a ratchet member 26.

Figure 2:
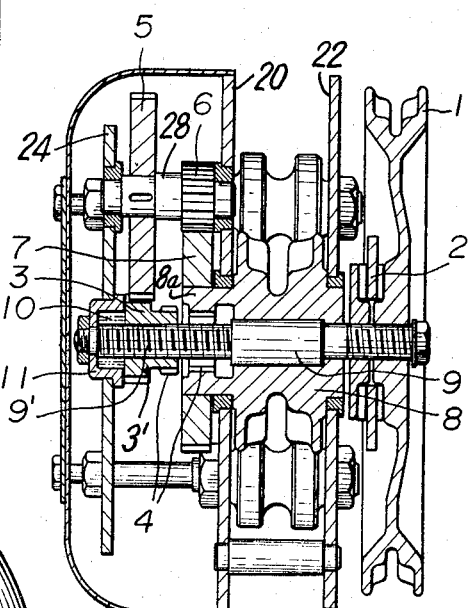
FIG. 2 is a section taken on the line 2—2 of FIG. 3.
Figure 3:
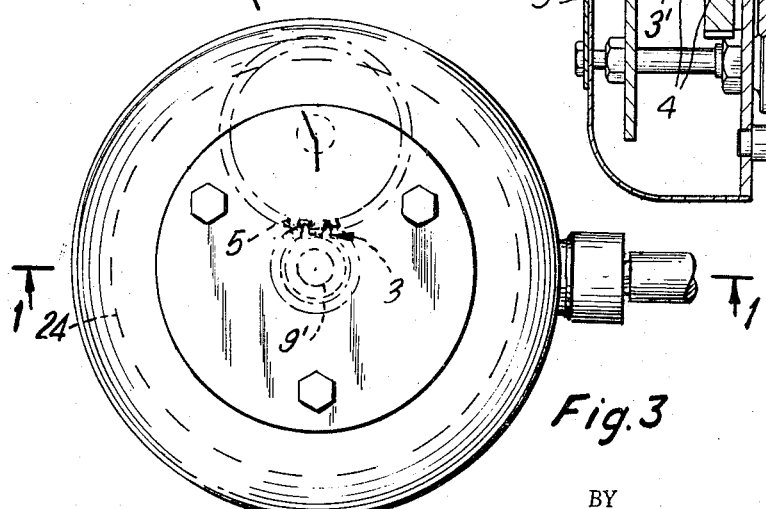
FIG. 3 is a front elevational view of the hoist indicated in FIG. 1.

When the winding drum 8 is loaded, the clutch gear 3 will be advanced along the spline shaft 9' toward the stop 11 until a gear portion 3' thereof engages with a gear 5 which is affixed to a reduction gear drive shaft 28. The teeth of the reduction gear 5 are such that the teeth urge the pinion portion 3' to the left against the stop 11 and his urging is increased by the action of the splines on the spline shaft 9'. With the gears 3' and 5 engaged, the shaft 28 is rotated to rotate a gear 6 thereon and drive the winding drum 8 through a gear 7 carried around a hub portion 8a. During this condition, as indicated in FIG. 2, at which the winding drum 8 is loaded, the clutch gear 3 will be urged against the stop 11 which will maintain it at the proper position to insure proper driving engagement between all the gears of the reduction gearing. When the mechanism is under a loaded condition, the gear 5 receives a force which works on the gear 3 to maintain it in a position against the stop 11. The force urging the clutch gear 3 toward the stop 11 is reduced in the winding down direction because of the action of the spline on the spline shaft 9', but the clutch gear 3 will never be detached from the engagement with the gear 5 during the normal loading conditions. This is so because the load applied on the gear 3 because of the loading action of the gear 5 will be stronger than the force applied by the spline of the spline gear 9'.

As soon as the load is released, however, the holding action produced by the gear 5 on the gear 3 will also be released and the tension of the spring 10 will be sufficient to cause the movement of the clutch gear 3 backwardly into a clutch engaged position so that the drive of the winding drum 8 will be completed through the clutch gear 3 in the manner of a direct connection.

The invention is particularly advantageous for saving time in hoisting loads since the hoisting chain may be rapidly manipulated whenever the device is unloaded because the driving arrangement will be directly to the winding drum. On the other hand, as soon as the device becomes loaded, the driving will be through transmission gearing which will provide for a high power lift. As soon as the load is removed because the gear 5 will no longer exert an influence on the clutch gear 3 to maintain it in engagement with the stop 11, the direct drive of the device will be readily restored because the spring 10 will urge the clutch gear into a clutch engaging position.

While a specific embodiment of the invention has been shown and described in detail to illustrate the application of the inventive principles, it will be understood that the invention may be embodied otherwise without departing from such principles.

What is claimed is:

1. A hoisting device comprising a drive shaft, a winding drum, means rotatably mounting said drive shaft and said winding drum for independent rotative movement, said drive shaft having a spiral spline portion, said winding drum having a first clutch portion, a clutch gear engaged on said spiral spline portion of said drive shaft for rotation with said drive shaft and being axially displaceable along said spline portion, said clutch gear having a driving gear portion and a second clutch portion engageable with said first clutch portion of said winding drum when said winding drum is unloaded, means for urging said clutch gear along said spiral spline portion in a direction to cause engagement of said second clutch portion with said first clutch portion when said winding drum is unloaded, reduction gearing connected to said winding drum and located adjacent said drive shaft, said spline portion being shaped to move said clutch gear therealong under a loaded condition of said winding drum in a direction to cause said second clutch portion to disengage from said first clutch portion and to cause said driving gear portion to engage said reduction gearing to drive said winding drum through said reduction gearing.

2. A hoisting device according to claim 1, wherein said reduction gearing includes a gear engaged with said gear portion of said clutch gear and providing in a loaded condition of said winding drum a force acting on said clutch gear to urge it to remain in engagement with said reduction gearing.

3. A hoisting device according to claim 2, including a stop formed on one end of the spline portion of said drive shaft, said gear portion of said clutch gear being urged against said stop by said gear of said reduction gearing when said winding drum is in a loaded condition.

4. A hoisting device according to claim 1, including a non-return brake connected to said drive shaft for limited return movement thereof, and a chain wheel connected to said drive shaft for rotating said drive shaft.

5. A hoisting device according to claim 1, wherein said spline on said spline portion of said drive shaft is at an inclination such that said clutch gear will be urged in a direction to move said second clutch portion out of engagement with said first clutch portion when said winding drum is unloaded and wherein said transmission gearing includes a gear having gears thereon with a helical tooth profile of an angle equivalent to said spline angle on said drive shaft in order to urge said clutch gear to engage said gear of said reduction gearing when said winding drum is in a loaded condition.

References Cited

UNITED STATES PATENTS

| | | | |
|---|---|---|---|
| 2,373,048 | 4/1945 | Parker | 254—169 |
| 2,403,462 | 7/1946 | Schroeder | 254—169 |
| 2,873,948 | 2/1959 | Colmer | 254—187 |

EVON C. BLUNK, *Primary Examiner.*

H. HORNSBY, *Assistant Examiner.*